United States Patent [19]
Goessler et al.

[11] 4,381,438
[45] Apr. 26, 1983

[54] ELECTRIC CONTROL APPARATUS FOR CONTROLLING INDUCTIVE HEATING

[75] Inventors: Gerhard Goessler; Friedrich Koch, both of Oberderdingen, Fed. Rep. of Germany

[73] Assignee: E.G.O. Regeltechnik GmbH, Waghaeusel, Fed. Rep. of Germany

[21] Appl. No.: 270,141

[22] Filed: Jun. 3, 1981

Related U.S. Application Data

[63] Continuation of Ser. No. 112,679, Jan. 16, 1980, Pat. No. 4,303,816.

[30] Foreign Application Priority Data

Jan. 16, 1979 [DE] Fed. Rep. of Germany ....... 2901556

[51] Int. Cl.³ .............................................. H05B 5/04
[52] U.S. Cl. ...................... 219/10.49 R; 219/10.55 B; 219/10.77; 219/431; 219/510; 336/82; 336/DIG. 2
[58] Field of Search .................. 219/10.49 R, 10.55 B, 219/10.55 M, 10.77, 10.79, 218, 431, 435, 438, 439, 440, 441, 442, 504, 505, 510; 336/82, DIG. 2

[56] References Cited

U.S. PATENT DOCUMENTS

| | | | |
|---|---|---|---|
| 2,424,393 | 7/1947 | Graves | 219/431 |
| 2,483,628 | 10/1949 | Davis | 219/431 |
| 2,507,666 | 5/1950 | Goldthwaite | 219/431 |
| 3,742,174 | 6/1973 | Harnden, Jr. | 219/10.49 |
| 3,742,175 | 6/1973 | Harnden, Jr. | 219/10.49 |
| 3,742,179 | 6/1973 | Harnden, Jr. | 219/10.77 |
| 4,162,381 | 7/1979 | Buck | 219/10.55 B |

FOREIGN PATENT DOCUMENTS

| | | | |
|---|---|---|---|
| 1022331 | 1/1958 | Fed. Rep. of Germany | 219/440 |
| 1029502 | 10/1958 | Fed. Rep. of Germany | 219/440 |
| 2161371 | 11/1978 | Fed. Rep. of Germany | 219/431 |
| 2633741 | 2/1978 | Fed. Rep. of Germany | 219/431 |
| 546347 | 7/1956 | Italy | 219/440 |

*Primary Examiner*—Volodymyr Y. Mayewsky
*Attorney, Agent, or Firm*—Steele, Gould & Fried

[57] ABSTRACT

A cooker apparatus for heating a cooking pot inductively comprises an induction heating coil and a control device for controlling the heating power. The control device has a temperature-dependent guiding and control means and a sensor unit, adapted to be positioned on the cooking pot and subjected there to the evolution of steam in the cooking pot. The sensor unit is arranged to transmit control signals to the guiding and control means.

11 Claims, 4 Drawing Figures

ELECTRIC CONTROL APPARATUS FOR CONTROLLING INDUCTIVE HEATING

CROSS REFERENCE TO RELATED APPLICATIONS

This is a continuation of application Ser. No. 112,679, filed Jan. 16, 1980 and now U.S. Pat. No. 4,303,816.

FIELD OF THE INVENTION

The invention relates to a cooker apparatus for heating a cooking pot inductively, the apparatus comprising an induction heating coil and a control device for manually controlling the heating power.

BACKGROUND OF THE INVENTION

Heating cooking pots inductively has the advantage that the heat is produced directly in the cooking pot and thus there are no problems of transmitting the heat. In order to control the power, either the operating frequency can be altered or the output can be clocked. Difficulties do admittedly arise as a result of the slight inertia of the inductive cooking point, because the timing pulses would have to follow each other rapidly. However, the suggestion has been made in German Offenlegungsschrift No. 2633741 of clocking the high frequency which is conveyed to the induction heating coil at such a rapid clock rate that a smoothing capacitor can be used to receive fluctuations of current at its input and reduce or eliminate feedback to the mains of what would otherwise be a fast timing pulse sequence.

In the known cooking apparatus which are heated inductively, adjusting the power is carried out manually by means of a power control. Using a temperature-dependent control presents difficulties. The cooking surface, that is, the supporting surface for the cooking pot, consists preferably of non-metallic material. If metallic material is used, then this could only be non-ferromagnetic material, which does not present a magnetic screening to the induction coil and which receives substantially no power as a result of the relatively deep penetration of the electromagnetic flux lines therein. In order to achieve the full advantages of an induction cooker, this relatively thin supporting surface for the cooking pot must extend over several cooking points. For this reason, openings for temperature sensors would be undesirable because the stability of the supporting surface would suffer greatly because of this. Also, the openings would prevent the chamber located below the supporting surface from being protected against the intrusion of damp and other undesired substances.

Other contact heat sensors would also be unsuitable since their use would impose a requirement for the use of a cooking pot having an absolutely flat base, which is otherwise not necessary for inductive heating. In any case, the reproducibility of the temperature control would be poor.

BRIEF SUMMARY OF THE INVENTION

An object of the invention is to provide a cooking apparatus for heating cooking pots inductively, which has a temperature-dependent control.

According to the invention there is provided a cooker apparatus for heating a cooking pot inductively, comprising an induction heating coil, a control device for controlling the heating power, the control device having a temperature-dependent guiding and control means, and a sensor unit, adapted to be positioned on the cooking pot and subjected there to the evolution of steam in the cooking pot, the sensor unit being arranged to transmit control signals to the guiding and control means.

Sensor units of a type which are subjected to the evolution of steam in the cooking pot are known for use with conventional cooker plates and are frequently used in practice, for example those sold under the name of "EGOMAT". They have been described in German Pat. Nos. 1022331 and 1029502. An embodiment which comprises a wire-less connection between the sensor unit positioned on the lid of the saucepan and the guiding and control component is known from German Pat. No. 2161371. However, the use of such sensor units in connection with induction-cooker apparatus is novel and provides surprising advantages. The low heat inertia of the induction heating, which is merely determined by the ability of the saucepan base to store heat, enables an extremely sensitive control to be carried out by using a sensor unit which senses the production of steam. The sensitive control does not suffer overshooting when the boiling point has been reached and even allows milk or other foodstuffs which are inclined to boil over due to the formation of a skin, to be easily controlled automatically from the point when boiling begins to the continuation of boiling. Attention is directed in this connection to the disclosure in German Pat. Nos. 1022331, 1029502 and 2161371.

Other advantages and features of the invention and of preferred embodiments are to be found in the claims and in the following description in connection with the drawings.

DETAILED DESCRIPTION OF THE ILLUSTRATED EMBODIMENT

Figure 1:
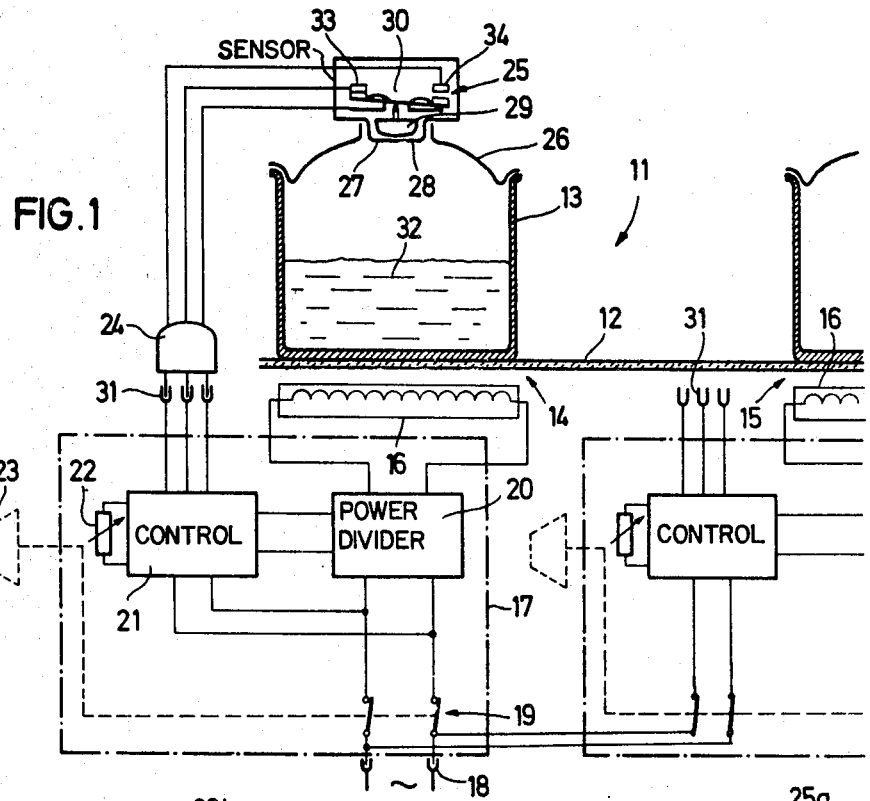
FIG. 1 is a schematic diagram of a cooker apparatus which comprises several cooking points, of which, however, only one is shown in complete form.

FIG. 1 shows a cooker apparatus 11, e.g. a cooker, which comprises a plate 12 as the cooking surface, preferably consisting of non-metallic material and at all events of a non-ferromagnetic material, upon which cooking pots 13 can be positioned. The base of the cooking pots is made of a ferromagnetic material which is suitable for converting a high-frequency electromagnetic alternating field into heat as a result of eddy currents.

Induction heat coils 16 are located beneath the plate 12 at the cooking points 14,15, the coils being supplied with a high-frequency alternating current via a control device 17 indicated by a dot-dashed line.

The control device 17 is connected to the domestic mains supply via terminals 18 and contains a double-pole cut-off 19, by means of which the control device can disconnected from the mains supply in the off-condition, and also contains an inverter/power divider 20 wherein the alternating current of the domestic mains supply is normally first of all rectified and is then converted by means of an inverter into a high-frequency alternating current whose frequency is in excess of 20

KHz. Also, the inverter/power divider facilitates the reduction of the maximum output by one or preferably more of the ways known per se. The basic power can preferably be reduced by changing or reducing the working frequency and the total power can also be changed by means of clocking. This clocking can be carried out for example with very high frequency clock pulses in the range of from between 2 and 100 Hz, and the feedback to the mains and possibly also disturbances from the mains can be substantially eliminated by means of a supporting capacitor.

A control and guiding means 21 is also part of the control device 17, and receives the current it requires by connection to the mains. The control and guiding means comprises an adjustable resistor 22 for adjusting the nominal value, which can be regulated by an adjusting knob 23 which also controls the double-pole cut-off 19.

A sensor unit 25 is connected to the control and guiding means 21 via a plug and socket 24. The sensor unit is positioned on an opening 27 in the lid 26 of the cooking pot 13. The opening 27 is bounded by an edge upon which the sensor unit 25 rests, and a projecting part 28 partially protrudes into or overlies the opening 27.

Steam evolving in the cooking pot issues out of the opening 27 and thereby makes direct contact with the projecting part 28 of the sensor unit where the temperature sensor 29 is located. In FIG. 1, the temperature sensor 29 is an expansion box which is filled with an expansion liquid and transmits its expansion movement to a snap switch 30. FIG. 1 shows a double snap switch the contacts of which are located on opposite sides of a common spring bridge and are normally closed. The current feed takes place via the support position of the spring tongues producing the snap effect. The switching contacts designed as "break contacts" could also be formed as "make contacts".

In addition to the one cooking point which is shown completely, although schematically, another cooking point is partially indicated which has an equivalent induction coil and control device. The sensor unit 25 has a lead cable terminating in a plug and socket 24. The plug and socket 24 is shown as being inserted in a three-pin plug 31 relating to the first cooking point but could be inserted instead in the plug 31 of the second cooking point 15 so as then to control this point.

The cooker apparatus shown in FIG. 1 functions as follows. After positioning the cooking pot 13, the required power level or cooking level is set by means of the adjusting knob 23. The induction coil 16 is first supplied with the full frequency and accordingly with the full output power of the cooking point by means of the inverter/power divider 20. The high-frequency alternating fields are converted into heat in the base of the cooking pot by means of eddy currents and they heat the cooking matter. Both the contact pairs 33 and 34 are closed in the sensor unit during the heating-up period. It would also be possible to arrange the control and guiding means in such a manner that the full power is not used during the heating-up period as well, but a clocked partial power corresponding to the adjustment of the power regulator 22 is used instead.

The expansion box 29 heats up and expands so that just below the boiling temperature its expansion opens the contact pair 34. The double snap switch 30 is adjusted to different temperatures by its two contact pairs. Opening the contact pair 34 produces a control signal which causes the inverter/power divider 20, via the control and guiding means 21, to switch over to a lower continuing cooking power from a high starting cooking power. When the boiling temperature has then been reached, the expansion box 29 heats up extremely rapidly to the steam temperature as a result of the steam condensing on the projection 28, so that now the contact 33, adjusted to a higher temperature, is also opened. This opening acts as a control signal which also causes the inverter/power divider, via the control and guiding means 21, to clock the continuing cooking power which is now substantially lower. In the simplest case, this could take place by the power being switched off upon opening the contact pair 33, and by switching it on again upon reclosing contact pair 33. The effect on the mains would not be very great, since the continuing cooking power is less than 50%, preferably 1/5 to ⅓ of the maximum power and thus the switching frequency is relatively low and the feedback to the mains is low. It has been shown that the control takes place in an extremely precise manner and produces a precise timing.

If this type of clocking cannot be used because of feedback to the mains, then it is possible to use the opening of the contact pair 33 as a control signal which starts a clocking operation which has a high timing frequency, as described above.

The last mentioned type of control could be achieved particularly advantageously by using a sensor unit 25a (see FIG. 2) in which a temperature-dependent resistor 35 (with a negative or positive temperature coefficient) is located in the sensor unit. In this way it would be possible to carry out the switch-over to continuing cooker power by a fixed switching point or a switching point which can be changed according to the nominal value adjustment, and then to carry out the clocking.

Figures 2, 3:
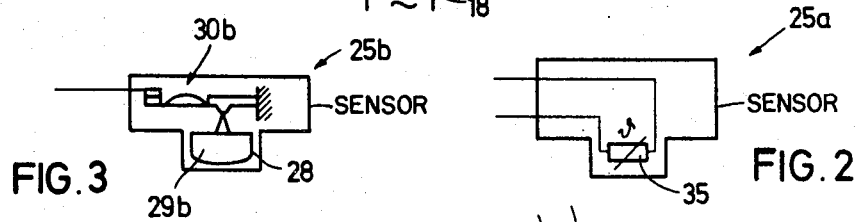
FIGS. 2 and 3 schematically show other embodiments of the sensor unit.

In the modification shown in FIG. 3, the sensor unit 25b contains an expansion box 29b, which acts on a simple snap switch 30b. By means of the first switch, a switch-over is made to continuing cooking power and then this power is clocked. In this case, the expansion box 29b can be filled with a liquid which boils just below the boiling point of water at a pre-set temperature and thereby produces a sudden rise of pressure and a reliable and rapid switching of the switch 30b.

Figure 4:
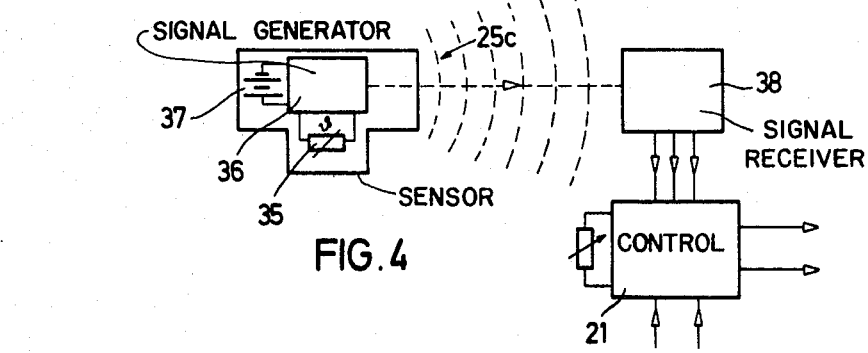
FIG. 4 shows another variation of the sensor unit and a part of the control device belonging thereto.

In the modification shown in FIG. 4, the sensor unit 25c also contains a temperature-dependent resistor 35 which is connected to a signal generator 36 provided in the sensor unit 25c and which is supplied by a battery 37. This signal generator emits control signals in the form of electromagnetic waves which are received by a receiver 38 and conveyed to the control and guiding means 21 as in the embodiment of FIG. 1. It is also possible in this case first of all to switch over to a continuing cooking power and then to clock this.

Details of a sensor apparatus shown in FIG. 4 are known from German Pat. No. 2161371. A transmission using ultrasonic waves or infrared radiation is also possible. It is also possible to switch over only once to the continuing cooking power by means of the sensor unit and moreover to carry out the power adaption manually by means of the set value regulator 22. Connecting the sensor unit 25 with the control device is preferably carried out in such a manner that manual operation via the adjusting knob 23 is also possible without an effect of the temperature on the sensor unit.

Various modifications can of course be made to the embodiments described. For example, the temperature-sensitive resistors 35 can be replaced by other temperature-sensitive electrical or electronic sensor components.

We claim:

1. An electric control apparatus for controlling inductive heating of a cooking pot at least partly comprising an electrically conductive material, said apparatus comprising:

an electric induction heating coil, for heating the pot by inducing an electric current thereof;

a device for controlling the electrical power delivered to the induction heating coil, the control device having a temperature-dependent guiding and control means; and, a temperature sensing unit adapted to be so positioned on the cooking pot, over matter being heated therein, as to be there subjected to rising steam formed in the cooking pot by the matter being heated, the sensing unit having means for transmitting control signals to the guiding and control means.

2. An apparatus according to claim 1, wherein the sensor unit is arranged to be triggered at a preset switching temperature below the boiling point of water.

3. An apparatus according to claim 1, wherein the sensor unit comprises a switch for switching the control device over from a high output at the start of a cooking operation to a lower subsequent output.

4. An apparatus according to claim 1, wherein the sensor unit comprises at least two switches which are mutually adjustable as to their operation temperature, the lower adjusted switch controlling a switch-over from a higher power output at the start of a cooking operation to a lower output for continued cooking and the higher adjusted switch controlling the continued cooking output.

5. An apparatus according to claim 1, wherein the sensor unit comprises a temperature-sensitive electrical sensor component by means of which control signals from the control device can be used to effect a power reduction dependent on sensor temperature.

6. An apparatus according to claim 5, wherein the temperature-sensitive component is a resistor.

7. An apparatus according to claim 1, wherein the sensor unit is adapted for connection to a selected one of a plurality of cooking points.

8. An apparatus according to claim 1, further comprising a switch, actuated by the control signals, for switching the control device from a high output at the start of a cooking operation to a lower subsequent output.

9. An apparatus according to claim 1, further comprising at least two switches, actuated by the control signals, which are mutually adjustable as to their operation temperature, the lower adjusted switch controlling a switch-over from a higher power output at the start of a cooking operation to a lower output for continued cooking and the higher adjustment switch controlling the continued cooking output.

10. An apparatus according to claims 4 or 9, wherein the switches comprise pairs of switching contacts.

11. An apparatus according to claim 5, wherein the temperature-sensitive electrical sensor component is an electronic component.

* * * * *